Patented Nov. 23, 1948

2,454,751

UNITED STATES PATENT OFFICE 2,454,751

PROCESS OF PREPARING 6-METHYL PTERIDINES

James H. Boothe, Pearl River, N. Y., assignor to American Cyanamid Company, New York, N. Y., a corporation of Maine No Drawing. Application July 27, 1946, Serial No. 686,717

9 Claims. (Cl. 260—251)

This invention relates to a new method of preparing 2-amino-4-hydroxy-6-methyl pyrimido [4,5-b] pyrazine.

In the copending application of John H. Mowat, Serial No. 633,870, filed December 8, 1945, now Patent No. 2,443,078, dated June 8, 1948, there is disclosed the preparation of certain 6- and 7-alkyl substituted pyrimidopyrazines, including 2-amino-4-hydroxy-6-methyl pyrimido [4,5-b] pyrazine. This latter compound has proven to be useful in the production of synthetic folic acid, now known as pteroylglutamic acid. Note Science, May 31, 1946, page 669. I have now found that this compound can be prepared by a distinctly different method having advantages over the process of the Mowat application.

The new process of the present invention employs as intermediates the 6-methylene products described and claimed in the copending application of Martin E. Hultquist, Serial No. 641,404, filed January 15, 1946. These products may be represented by the general formula:

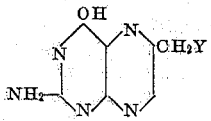

in which Y is a radical of the group consisting of the residue of tertiary amines, such as

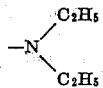

and quaternary ammonium compounds, such as

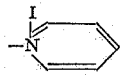

The preparation of preferred compounds of this class are shown in the specific examples.

To prepare the 6-methyl pterins of the present invention the compounds of the Hultquist application are treated with a reducing agent, preferably metallic zinc and an alkali, whereby the group represented by Y in the general formula is split off and replaced with hydrogen. During this reduction the pyrazyl ring is in part hydrogenated to the dihydro form, but this product may be easily oxidized by treatment with oxidizing agents or even upon exposure to atmospheric oxygen to the desired compound of the present invention.

To illustrate the process in greater particularity the following examples disclose specific methods of preparing a preferred intermediate, followed by the reduction of this compound to produce the 6-methyl pterin of the present invention.

Example 1

To a solution of 15 gm. (0.07 mole) 2,4,5-triamino-6-hydroxy pyrimidine dihydrochloride in 200 cc. water was added enough pyridine to bring the solution to pH about 5. To this was added a solution of 21.4 gm. (0.1 mole) 2,3-dibromopropionaldehyde in 100 cc. acetone, while adding pyridine as necessary to keep the mixture at pH 4–5, with cooling to keep the temperature of the solution at 30–40° C. As soon as no more pyridine was required to maintain the pH at 4–5, 20 gm. Hyflo was added, and a brown insoluble precipitate was filtered off and discarded. The filtrate was acidified with hydrochloric acid to pH 3–4, and a solution of iodine in potassium iodide and water was added until the reaction mixture gave a blue-black spot on starch-iodide test paper. There was an immediate precipitation of the light tan crystalline N-[(2-amino-4-hydroxy-6-pyrimido[4,5-b]pyrazyl) methyl]pyridinium iodide amounting to 8 gms. or 30% of theory.

1 gm. of the foregoing product was dissolved in 100 cc. of 1 N NaOH after which 3 gm. of zinc dust was added and the mixture stirred for 30 minutes at room temperature. The odor of pyridine was quite evident. The solution was filtered free of zinc and acidified to about pH 2. The precipitate which formed was filtered out and dried. It weighed 0.5 gm.

A solution of 200 mg. of the above product in 10–15 cc. of dilute NaOH was treated with 3.74 cc. of 0.1 N KMnO₄, dropwise with stirring. This is the calculated amount of KMnO₄ to oxidize the dihydro pteridine to the aromatic form. The KMnO₄ was used up quite rapidly at room temperature. The resulting MnO₂ was filtered out and the solution acidified to pH 2 whereupon a precipitate was formed. The precipitated product, which was found to be 2-amino-4-hydroxy-6-methyl pyrimido [4,5-b] pyrazine, was centrifuged and crystallized as the sodium salt from 12 cc. of 5 N NaOH. The sodium salt was dissolved in water and precipitated as the free acid by acidification. Further examination of the product proved it to be identical with a sample of 2-amino-4-hydroxy-6-methyl pyrimido [4,5-b] pyrazine prepared by the Mowat process.

Example 2

15 g. N-[(2-amino-4-hydroxy-6-pyrimido [4,5-b]pyrazyl) methyl] pyridinium iodide was dissolved in 1500 ml. 1 N NaOH, stirred well and 45 g. zinc dust was added. After 30 minutes the zinc dust was filtered out and solid $CO_2$ was added to precipitate the pteridine and $ZnCO_3$. The precipitate was filtered off and then stirred with water and acetic acid added to pH 4 to dissolve out most of the $ZnCO_3$. The residue was mixed with 500 ml. water and 200 ml. acetic acid which dissolved most of it. The solution was filtered and 5–6 ml. 30% $H_2O_2$ was added which oxidized the dihydro pteridine to the unsaturated 2-amino-4-hydroxy-6-methyl pyrimido [4,5-b] pyrazine which immediately precipitated.

*Example 3*

20 g. N-[(2-amino - 4 - hydroxy - 6 - pyrimido [4,5-b]pyrazyl) methyl] pyridinium iodide was dissolved in one liter of 1 N NaOH and 40 g. zinc dust was added. The mixture was stirred for 30–35 minutes, the excess zinc was filtered out, and the solution acidified with hydrochloric acid. The precipitate was filtered out and then redissolved in 700 ml. water by adding enough hydrochloric acid. 5 ml. 30% $H_2O_2$ was added, the solution was filtered and neutralized to pH 7, and the product, 2-amino-4-hydroxy-6-methyl pyrimido [4,5-b] pyrazine, was filtered off. It was crystallized from 250 ml. 5 N NaOH as the sodium salt and then precipitated as the free acid.

*Example 4*

100 g. (2-amino-4-hydroxy-6-pyrimido [4,5-b] pyrazyl) methyl pyridinium iodide was dissolved in 4 liters of water containing 160 g. NaOH. 100 g. zinc dust was added and the mixture was stirred for 20 minutes. The zinc dust was filtered out and 16 ml. 30% $H_2O_2$ was added. The solution was heated on a steam bath and clarified with charcoal. This solution was then added dropwise to a hot solution of 600 ml. acetic acid in 2 liters of water. After cooling, the product, 2-amino-4-hydroxy-6-methyl pyrimido [4, 5-b] pyrazine, was filtered out and dried.

*Example 5*

To a solution of 216 gms (1 mole) 2,3-dibromopropionaldehyde in 500 cc. anhydrous ether cooled to −50° C. was added a solution at −50° C. of 73 gm. (1 mole) diethylamine in 500 cc. anhydrous ether with cooling to keep the temperature at −30° to −40° C. The slurry of white solid in ether was allowed to stand for an hour, during which time the temperature rose to +10° C. There was added 100 cc. water to dissolve the product, and the ether layer was discarded.

The water solution was added to 100 gm. (0.47 mole) 2,4,5-triamino-6-hydroxypyrimidine dihydrochloride suspended in 300 cc. water. Sodium hydroxide (5 N) was added to bring the pH to about 3, and 100 cc. solution containing 20 gm. iodine and 40 gms. potassium was added.

Concentrated sulfuric acid to pH 1–2 was added and the solution cooled to 30° C. The unreacted 2,4,5-triamino-6-hydroxypyrimidium sulfate was removed.

On neutralization of the filtrate to pH 7 and cooling to 5° C. there was obtained a brown precipitate which was filtered off. This filter cake was extracted with 3–500 cc. portions of hot 10% acetic acid, and the solutions treated with 50 gm. portions of potassium iodide, cooled and filtered.

After two recrystallizations of the material from 10% potassium iodide solution there was obtained bright yellow crystals of 2-amino-4-hydroxy-6-(diethylaminomethyl) pyrimido [4,5-b] pyrazine hydriodide.

A sample slurried in water and treated with sodium hydroxide to pH 8–8.5 gave a light-tan product, the analysis of which agreed well for that of 2-amino-4-hydroxy-6-(diethylaminomethyl) pyrimido [4,5-b] pyrazine.

Treatment of the above product with metallic zinc and an alkali as in the preceding examples results in the formation of 2-amino-4-hydroxy-6-methyl pyrimido [4,5-b] pyrazine.

I claim:

1. A method of preparing 2-amino-4-hydroxy-6-methyl pyrimido [4,5-b] pyrazine which comprises treating a 2-amino-4-hydroxy pyrimido [4,5-b] pyrazine having as a substituent at the 6-position the group —$CH_2Y$ in which Y is a nitrogen atom having additional substituents of the group consisting of those constituting tertiary amines and quaternary ammonium compounds with a reducing agent comprising metallic zinc and an alkali whereby the group represented by Y is removed and replaced with hydrogen and thereafter recovering 2-amino-4-hydroxy-6-methylpyrimido [4,5-b] pyrazine.

2. A method of preparing 2-amino-4-hydroxy-6-methyl pyrimido [4,5-b] pyrazine which comprises treating an N-[(2-amino-4-hydroxy-6-pyrimido [4,5-b] pyrazyl) methyl] pyridinium halide with metallic zinc and an alkali whereby the pyridinium halide group is removed and replaced with hydrogen and thereafter recovering 2-amino-4-hydroxy-6-methylpyrimido [4,5-b] pyrazine.

3. A method of preparing 2-amino-4-hydroxy-6-methyl pyrimido [4,5-b] pyrazine which comprises treating an N-[(2-amino-4-hydroxy-6-pyrimido [4,5-b] pyrazyl) methyl] pyridinium halide with metallic zinc and sodium hydroxide whereby the pyridinium halide group is removed and replaced with hydrogen and thereafter recovering 2-amino-4-hydroxy-6-methylpyrimido [4,5-b] pyrazine.

4. A method of preparing 2-amino-4-hydroxy-6-methyl pyrimido [4,5-b] pyrazine which comprises treating an N-[(2-amino-4-hydroxy-6-pyrimido [4,5-b] pyrazyl) methyl] pyridinium iodide with metallic zinc and sodium hydroxide whereby the pyridinium iodide group is removed and replaced with hydrogen and thereafter recovering 2-amino-4-hydroxy-6-methylpyrimido [4,5-b] pyrazine.

5. A method of preparing 2-amino-4-hydroxy-6-methyl pyrimido [4,5-b] pyrazine which comprises treating an N-[(2-amino-4-hydroxy-6-pyrimido [4,5-b] pyrazyl) methyl] pyridinium bromide with metallic zinc and sodium hydroxide whereby the pyridinium bromide group is removed and replaced with hydrogen and thereafter recovering 2-amino-4-hydroxy-6-methylpyrimido [4,5-b] pyrazine.

6. A method of preparing 2-amino-4-hydroxy-6-methyl pyrimido [4,5-b] pyrazine which comprises treating 2-amino-4-hydroxy-6-(dialkylamino-methyl) pyrimido [4,5-b] pyrazine with metallic zinc and sodium hydroxide whereby the dialkylamino group is removed and replaced with hydrogen and thereafter recovering 2-amino-4-hydroxy-6-methylpyrimido [4,5-b] pyrazine.

7. A method of preparing 2-amino-4-hydroxy-6-methyl pyrimido [4,5-b] pyrazine which comprises treating 2-amino-4-hydroxy-6-(diethylaminomethyl) pyrimido [4,5-b] pyrazine with metallic zinc and sodium hydroxide whereby the diethylamino group is removed and replaced with hydrogen and thereafter recovering 2-amino-4-hydroxy-6-methylpyrimido [4,5-b] pyrazine.

8. A method of preparing 2-amino-4-hydroxy-6-methyl pyrimido [4,5-b] pyrazine which comprises treating a 2-amino-4-hydroxy pyrimido [4,5-b] pyrazine having as a substituent at the 6-position the group —$CH_2Y$ in which Y is a nitrogen atom having additional substituents of the group consisting of those constituting tertiary amines and quaternary ammonium compounds with a reducing agent comprising metallic zinc and an alkali whereby the group represented by Y is removed and replaced with hydrogen, treating the product with an oxidizing agent and thereafter recovering 2-amino-4-hydroxy-6-methylpyrimido [4,5-b] pyrazine.

9. A method of preparing 2-amino-4-hydroxy-6-methyl pyrimido [4,5-b] pyrazine which comprises treating an N-[(2-amino-4-hydroxy-6-pyrimido [4,5-b] pyrazyl) methyl] pyridinium halide with metallic zinc and sodium hydroxide whereby the pyridinium halide group is removed and replaced with hydrogen, treating the product with an oxidizing agent to convert any of the dihydro pteridine that may have been formed to the aromatic pyrazyl form and thereafter recovering 2 - amino - 4 - hydroxy-6-methylpyrimido [4,5-b] pyrazine.

JAMES H. BOOTHE.

No references cited.